(12) United States Patent
Bhagwagar et al.

(10) Patent No.: US 10,000,680 B2
(45) Date of Patent: *Jun. 19, 2018

(54) HIGH TEMPERATURE STABLE THERMALLY CONDUCTIVE MATERIALS

(71) Applicant: Dow Corning Corporation, Midland, MI (US)

(72) Inventors: Dorab Bhagwagar, Saginaw, MI (US); Kelly Messing, Auburn, MI (US); Elizabeth Wood, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/439,644

(22) Filed: Feb. 22, 2017

(65) Prior Publication Data

US 2017/0158937 A1  Jun. 8, 2017

Related U.S. Application Data

(63) Continuation of application No. 13/990,446, filed as application No. PCT/US2012/020699 on Jan. 10, 2012, now Pat. No. 9,598,575.

(60) Provisional application No. 61/436,214, filed on Jan. 26, 2011.

(51) Int. Cl.
| | |
|---|---|
| C09K 5/14 | (2006.01) |
| C08L 83/04 | (2006.01) |
| C08K 5/3417 | (2006.01) |
| C08K 5/00 | (2006.01) |
| C08K 3/04 | (2006.01) |
| C08K 5/34 | (2006.01) |
| F28F 23/00 | (2006.01) |
| F28F 21/06 | (2006.01) |
| C08K 3/22 | (2006.01) |
| C08K 3/28 | (2006.01) |
| C08K 3/14 | (2006.01) |
| C08G 77/12 | (2006.01) |
| C08G 77/20 | (2006.01) |
| C08K 5/3467 | (2006.01) |
| C08K 5/56 | (2006.01) |

(52) U.S. Cl.
CPC ............... *C09K 5/14* (2013.01); *C08K 3/04* (2013.01); *C08K 5/0091* (2013.01); *C08K 5/34* (2013.01); *C08K 5/3417* (2013.01); *C08L 83/04* (2013.01); *F28F 21/067* (2013.01); *F28F 23/00* (2013.01); *C08G 77/12* (2013.01); *C08G 77/20* (2013.01); *C08K 3/013* (2018.01); *C08K 3/14* (2013.01); *C08K 3/28* (2013.01); *C08K 5/3467* (2013.01); *C08K 5/56* (2013.01); *C08K 2003/2217* (2013.01); *C08K 2003/2227* (2013.01); *C08K 2003/2296* (2013.01); *C08L 2205/02* (2013.01)

(58) Field of Classification Search
USPC .......................................... 524/588
See application file for complete search history.

(56) References Cited

U.S. PATENT DOCUMENTS

| | | |
|---|---|---|
| 2,723,964 A | 11/1955 | Warrick |
| 3,364,161 A | 1/1968 | Nadler |
| 3,445,420 A | 5/1969 | Kookootsedes et al. |
| 3,989,667 A | 11/1976 | Lee et al. |
| 4,025,693 A | 5/1977 | Milne |
| 4,087,585 A | 5/1978 | Schulz |
| 4,370,358 A | 1/1983 | Hayes et al. |
| 4,584,361 A | 4/1986 | Janik et al. |
| 4,707,531 A | 11/1987 | Shirahata |
| 5,036,117 A | 7/1991 | Chung et al. |
| 5,153,244 A | 10/1992 | Akitomo et al. |
| 5,194,649 A | 3/1993 | Okawa |
| 5,310,843 A | 5/1994 | Morita |
| 6,169,142 B1 | 1/2001 | Nakano et al. |
| 6,255,376 B1 | 7/2001 | Shikata et al. |
| 6,284,817 B1 | 9/2001 | Cross |
| 6,380,301 B1 | 4/2002 | Enami et al. |
| 7,141,273 B2 | 11/2006 | Endo |
| 9,481,851 B2 | 11/2016 | Matsumoto |
| 9,783,723 B2 | 10/2017 | Akiba |
| 2003/0049466 A1 | 3/2003 | Yamada et al. |
| 2003/0207128 A1 | 11/2003 | Uchiya et al. |
| 2004/0092655 A1 | 5/2004 | Otomo |
| 2004/0195678 A1 | 10/2004 | Yamazaki et al. |
| 2005/0228097 A1 | 10/2005 | Zhong |
| 2006/0014888 A1 | 1/2006 | Miller |
| 2007/0219312 A1 | 9/2007 | David |
| 2008/0073623 A1 | 3/2008 | Wang et al. |
| 2009/0247663 A1 | 10/2009 | Kamohara et al. |

(Continued)

FOREIGN PATENT DOCUMENTS

| | | |
|---|---|---|
| EP | 2516554 A1 | 10/2012 |
| GB | 893399 | 4/1962 |

(Continued)

OTHER PUBLICATIONS

International Search Report for Application No. PCT/US2012/020699 dated Mar. 27, 2012, 3 pages.

(Continued)

*Primary Examiner* — Marc S Zimmer

(74) *Attorney, Agent, or Firm* — Howard & Howard Attorneys PLLC

(57) ABSTRACT

Disclosed herein are compositions, preparation methods, and use of thermally conductive materials comprising silicone composition curable by hydrosilylation, thermally conductive fillers, and phthalocyanine. The novel composition retains its desirable pliability after cure even when kept at an elevated temperature for an extended period.

17 Claims, 2 Drawing Sheets

(56) References Cited

U.S. PATENT DOCUMENTS

2009/0258968 A1 10/2009 Meyer et al.
2016/0208156 A1 7/2016 Kitazawa

FOREIGN PATENT DOCUMENTS

| JP | 01-279981 | 11/1989 |
| JP | H03-146560 | 6/1991 |
| JP | 2009-234112 | 10/2009 |
| WO | 2010/104534 | 9/2010 |
| WO | 2011/078405 A1 | 6/2011 |

OTHER PUBLICATIONS

Dal, Degradation Mechanisms of Siloxane-based Thermal Interface Materials Under Reliability Stress Conditions, published in IEEE 42nd Annual International Reliability Physics Symposium, Phoenix 2004, p. 537.542.

Electrically Conductive Adhesives (2008) by CRC Press, p. 91-92.
Masterbond Internet page, Modulus, Poisson's Ratio and Elongation, downloaded Aug. 14, 2015, 2 pages.
Soils-Part 2: Physical Properties of Soil and Soil Water taken from the Plant & Soil Sciences eLibrary, downloaded Dec. 16, 2015, 2 pages.
Web page with url http://accuratus.com/alumox.html disclosing the density of alumina, downloaded Sep. 9, 2015 and Oct. 31, 2016, 5 pages.
Web page with url http://www.mit.edu/~6.777/matprops/pdms.htm disclosing the density of polydimethylsiloxane, downloaded Sep. 9, 2015 and Oct. 31, 2016, 2 pages.
Wikipedia entry on particle density, downloaded Dec. 16, 2015, 2 pages.
Zha et al., Low dielectric permittivity and high thermal conductivity silicone rubber composites with micro-nano-sized particles, Applied Physics Letters 101, 062905-1-4 (2012).
Ceramic Industry, Ross: Lab Mixer, www.mixers.com, Jan. 18, 2013, 2 pages.
Denka Electronics & Innovative Products, Denka Spherical Alumina, http://www.denka.co.jp/eng/denzai/product/filler/detail_002885.html, downloaded Nov. 12, 2015, 3 pages.
Sumitomo Chemical, Product Databook, (Excerpt) High Purity Alumina (HPA), Mar. 2014, 7 pages.

HIGH TEMPERATURE STABLE THERMALLY CONDUCTIVE MATERIALS

CROSS REFERENCE TO RELATED APPLICATIONS

This application is a continuation of U.S. patent application Ser. No. 13/990,446, filed on May 30, 2013, which is the National Stage of International Patent Application No. PCT/US12/020699, filed on Jan. 10, 2012, which claims priority to and all the advantages of U.S. Provisional Patent Application No. 61/436,214, filed on Jan. 26, 2011, the contents of which are incorporated herein by reference.

BACKGROUND OF THE INVENTION

Thermally conductive gels and encapsulants are soft, compliant and highly conductive materials used to transfer heat away from heat-generating electronic components. It is important that the physical properties of these materials, such as hardness and compliancy, are retained during the life of the electronic component, to protect the electronic devices and maintain good contact with the heat conducting substrates. However, it is often found that with long exposure to temperatures in the 90 to 150° C. range, the hardness of the thermally conductive gels or encapsulants can significantly increase, and the effectiveness of the gels or encapsulants decrease as they begin to fail stay in close contact with the electronic components. Thermally conductive gels and encapsulants have high loading of a thermally-conductive filler in typically an organosiloxane elastomer matrix. Even though the organosiloxane elastomer matrix is stable to temperatures in the 90 to 150° C. range, it is believed that with the filler (and the large amount of surface area from the filler), there are numerous side reactions that can contribute to the increase in hardness over time.

Therefore, there is an unmet need for thermally conductive gels and encapsulants that remain soft and compliant after a prolonged exposure to an elevated temperature.

Phthalocyanine compounds and metal derivatives of these compounds have been used as pigments in silicone resins and in organosiloxane compositions that are subsequently cured to form elastomers either by the use of organic peroxides and heating or by the reaction of hydroxyl-terminated polydiorganosiloxanes with alkyl silicates or organohydrogensiloxanes. References disclosing this use of phthalocyanine compounds include U.S. Pat. No. 3,364,161 British patent no. 1,470,465; and Japanese patent publication nos. 1/279,981 and 62/223,788.

The use of indanthrene blue, terphenyl, phthalocyanines or metal phthalocyanines to impart a resistance to degradation in the presence of heat and ionizing radiation to specified types of silicone elastomers is taught in British patent no. 893,399. The elastomers are cured using an organic peroxide, sulfur or alkyl silicates in the presence of metal salts of carboxylic acids or amines as catalysts. U.S. Pat. No. 2,723,964 teaches using polynuclear benzenoid compounds such as copper phthalocyanine and ingoid dyes to improve the thermal stability of silicone elastomers cured using organic peroxides.

Addition of phthalocyanine to silicone elastomers are known to improve the compression set values of the cured silicone elastomers as taught in U.S. Pat. No. 5,153,244.

SUMMARY OF THE INVENTION

The Inventors found that incorporation of phthalocyaninato-based pigments has large favorable impact on preventing the increase in hardness of thermally conductive polysiloxane materials over time at high temperatures than have been previously reported.

An aspect of the invention is a composition comprising (A) an organoalkylpolysiloxane having in one molecule on average at least 0.1 silicon-bonded alkenyl groups; (B) an organopolysiloxane having in one molecule on average at least 2 silicon-bonded hydrogen atoms; (C) a hydrosilylation reaction catalyst in an amount sufficient to initiate curing of the composition (A) and (B); (D) a thermally conductive filler; and (E) an additive selected from the group consisting of metal-free and metal-containing phthalocyanine compounds.

In some embodiments, the additive is a metal-containing phthalocyanine compound. In particular, the metal is copper. More particularly, the copper-containing phthalocyanine compound is 29H, 31H-phthalocyaninato (2-)-N29, N30, N31, N32 Copper.

In some embodiments, the thermally conductive filler of the composition of the invention is selected from aluminum nitride, aluminum oxide, aluminum trihydrate, barium titanate, beryllium oxide, boron nitride, carbon fibers, diamond, graphite, magnesium hydroxide, magnesium oxide, metal particulate, onyx, silicon carbide, tungsten carbide, zinc oxide, and a combination thereof.

Another aspect of the invention is a cured silicone prepared by curing the composition described in the immediately preceding paragraphs. Yet another aspect of the invention is a method of increasing the stability of a thermally conductive polyorganosiloxane composition comprising the step of adding a phthalocyanine compound to the curable polyorganosiloxane composition. The invention also provides a method of conducting heat from a first component to a second component wherein a composition comprising a silicone material obtained by curing the above-described composition containing a phthalocyanine compound is in contact with the first component and with the second component.

DETAILED DESCRIPTION OF THE INVENTION

Figure 1:
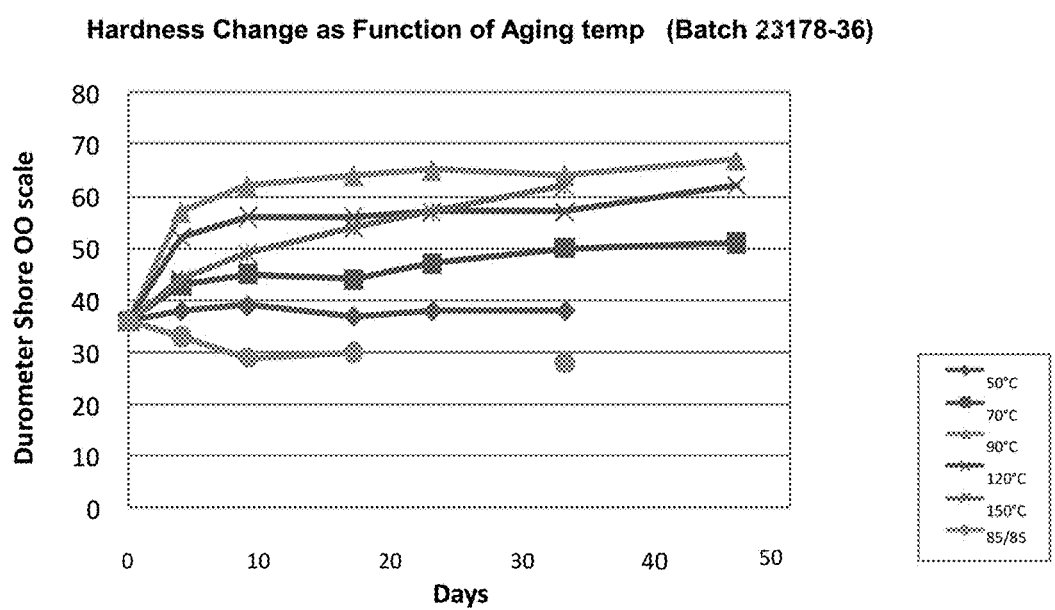
FIG. 1 shows that the hardness of a thermally conductive polyorganosiloxane composition increases over time in a temperature dependent manner.

1. Curable polyorganosiloxane composition. The present invention provides a polyorganosiloxane composition curable by hydrosilylation and comprising a phthalocyanine compound to form a thermally conductive silicone composition that maintains its pliable nature even after a prolonged exposure to an elevated temperature. The composition comprises (A) an organoalkylpolysiloxane having in one molecule on average at least 0.1 silicon-bonded alkenyl groups; (B) an organopolysiloxane having in one molecule on average at least 2 silicon-bonded hydrogen atoms; (C) a hydrosilylation reaction catalyst in an amount sufficient to initiate curing of the composition (A) and (B); (D) a thermally conductive filler; and (E) a stabilizing additive selected from the group consisting of metal-free and metal-containing phthalocyanine compounds. The composition may optionally contain additional Components that impart further functionalities to the composition and to the cured material of the composition.

Thermally conductive organopolysiloxane materials after curing have the tendency to harden over time at an elevated temperature. The stabilizing additive delays or prevents the progress of this increase in hardness. The instant invention presents phthalocyanine compounds that are useful as stabilizing additives.

Component (A)—Base Polymer

The organoalkylpolysiloxane polymer that constitutes component (A) contains in one molecule on average at least 2 silicon-bonded alkenyl groups. The organoalkylpolysiloxane may have a linear molecular structure or, to some extent, branched linear, or dendrite molecular structure. It may be in the form of a single polymer, copolymer, or a mixture of two or more polymers.

The silicon-bonded alkenyl groups of component (A) are exemplified by vinyl, allyl, butenyl, pentenyl, hexenyl, or hepteny groups, of which preferable are vinyl, allyl, or hexenyl groups. More than one kind of alkenyl groups may be found in one molecule. The aliphatically unsaturated organic groups in component (A) may be located at terminal, pendant, or both terminal and pendant positions.

The remaining silicon-bonded organic groups in component (A) may be monovalent organic groups free of aliphatic unsaturation. These monovalent organic groups may have at least one and as many as 2, 3, 4, 5, 6, 7, 8, 9, 10, 11, 12, 16, 18, and 20 carbon atoms, and are exemplified by, but not limited to alkyl groups such as methyl, ethyl, propyl, butyl, pentyl, octyl, decyl, undecyl, dodecyl and octadecyl; cycloalkyl groups such as cyclopentyl and cyclohexyl; and aromatic (aryl) groups such as phenyl, tolyl, xylyl, benzyl, and 2-phenylethyl; and 3,3,3,-trifluoropropyl, or similar halogenated alkyl groups. In certain embodiments, the organic groups are methyl or phenyl groups.

The terminal groups may be alkyl or aryl groups as described in the preceding paragraph, alkoxy groups exemplified by methoxy, ethoxy, or propoxy groups, or hydroxyl groups.

Certain exemplary molecules of component (A) may be described by the following formulae:

Formula (I)

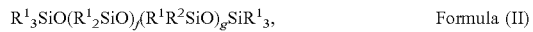

Formula (II)

or a combination thereof.

In formulae (I) and (II), each $R^1$ is independently a monovalent organic group free of aliphatic unsaturation and each $R^2$ is independently an aliphatically unsaturated organic group. Subscript d has an average value of at least 0.1, typically at least 0.5, more typically at least 0.8, and most typically, at least 2, alternatively subscript d may have a value ranging from 0.1 to 2000. Subscript e may be 0 or a positive number. Alternatively, subscript e may have an average value ranging from 0 to 2000. Subscript f may be 0 or a positive number. Alternatively, subscript f may have an average value ranging from 0 to 2000. Subscript g has an average value of at least 0.1, typically at least 0.5, more typically at least 0.8, and most typically, at least 2. Alternatively subscript g may have an average value ranging from 0.1 to 2000. Suitable monovalent organic groups for $R^1$ include, but are not limited to, alkyl such as methyl, ethyl, propyl, pentyl, octyl, undecyl, and octadecyl; cycloalkyl such as cyclopentyl and cyclohexyl; and aryl such as phenyl, tolyl, xylyl, benzyl, and 2-phenylethyl. Each $R^2$ is independently an aliphatically unsaturated monovalent organic group, exemplified by alkenyl groups such as vinyl, allyl, butenyl, pentenyl, hexenyl, or heptenyl group.

Exemplary molecules useful as component (A) are:
a dimethylpolysiloxane capped at both molecular terminals with dimethylvinylsiloxy groups;
a dimethylpolysiloxane capped at both molecular terminals with methylphenylvinylsiloxy groups;
a copolymer of a methylphenylsiloxane and a dimethylsiloxane capped at both molecular terminals with dimethylvinylsiloxy groups;
a copolymer of a methylvinylsiloxane and a dimethylsiloxane capped at both molecular terminals with trimethylsiloxy groups;
a copolymer of a methylvinylsiloxane and a dimethylsiloxane capped at both molecular terminals with dimethylvinylsiloxy groups;
a methyl (3,3,3-trifluoropropyl) polysiloxane capped at both molecular terminals with dimethylvinylsiloxy groups;
a copolymer of a methyl (3,3,3-trifluoropropyl) siloxane and a dimethylsiloxane capped at both molecular terminals with dimethylvinylsiloxy groups;
a copolymer of a methylvinylsiloxane and a dimethylsiloxane capped at both molecular terminals with silanol groups;
a copolymer of a methylvinylsiloxane, a methylphenylsiloxane, and a dimethylsiloxane capped at both molecular terminals with silanol groups; or
an organosiloxane copolymer composed of siloxane units represented by the following formulae: $(CH_3)_3 SiO_{1/2}$, $(CH_3)_2 (CH_2=CH)SiO^{1/2}$, $CH_3SiO_{3/2}$, and $(CH_3)_2 SiO_{2/2}$.

Component (A) can be one single base polymer or a combination comprising two or more base polymers that differ in at least one of the following properties: structure, viscosity, average molecular weight, siloxane units, and sequence.

Methods of preparing polyorganoalkylsiloxane fluids suitable for use as component (A), such as hydrolysis and condensation of the corresponding organohalosilanes or equilibration of cyclic polydiorganosiloxanes, are well known in the art.

In addition to the polydiorganosiloxane described above, component (A) may further comprise a resin such as an MQ resin consisting essentially of $R^xSiO_{1/2}$ units and $SiO_{4/2}$ units, a TD resin consisting essentially of $R^xSiO_{3/2}$ units and $R^x_2SiO_{2/2}$ units, an MT resin consisting essentially of $R^xSiO$ units and $R^xSiO_{3/2}$ units, an MTD resin consisting essentially of $R^xSiO_{1/2}$ units, $R^xSiO_{3/2}$ units, and $R^x_2SiO_{2/2}$ units, or a combination thereof. $R^x$ designates any monovalent organic group, for example but are not limited to, monovalent hydrocarbon groups and monovalent halogenated hydrocarbon groups. Monovalent hydrocarbon groups include, but are not limited to, alkyl such as methyl, ethyl, propyl, pentyl, octyl, undecyl, and octadecyl; cycloalkyl such as cyclohexyl; alkenyl such as vinyl, allyl, butenyl, and hexenyl; alkynyl such as ethynyl, propynyl, and butynyl; and aryl such as phenyl, tolyl, xylyl, benzyl, and 2-phenylethyl.

Component (B)—Crosslinker

Component (B) comprises a silane or an organopolysiloxane that has in one molecule on average at least 2 silicon-bonded hydrogen atoms, which participate in a hydrosilylation reaction with alkyl groups of component (A) and, as a result, cross-links and cures component (A). Component (B) may have a linear, branched, partially branched linear, cyclic, dendrite, or resinous molecular structure. The silicon-bonded hydrogen atoms in component (B) may be located at terminal, pendant, or at both terminal and pendant positions.

The amount of component (B) relative to component (A) should be such that it is sufficient to provide a molar ratio of SiH groups in component (B) to aliphatically unsaturated organic groups in component (A) (commonly referred to as the SiH:Vi ratio) ranging from 10:1 to 0.1:1, depending on the desired properties of the cured product of the composition. In certain embodiments, the SiH:Vi ratio is within the range of 3:1, and in other embodiments, about 2:1 or about 0.3:1; preferably from 1.5:1 to 0.5:1

Silicon-bonded groups of component (B) other than silicon-bonded hydrogen atoms may be represented by monovalent hydrocarbon groups which do not contain unsaturated aliphatic bonds, such as methyl, ethyl, propyl, butyl, pentyl, hexyl, heptyl, octyl, decyl, undecyl, dodecyl, or similar alkyl groups; cyclopentyl, cyclohexyl, or similar cycloalkyl groups; phenyl, tolyl, xylyl, or similar aryl groups; benzyl, phenethyl, or similar aralkyl groups; or 3,3,3-trifluoropropyl, 3-chloropropyl, or similar halogenated alkyl group. Preferable are alkyl and aryl groups, in particular, methyl and phenyl groups.

Component (B) may comprise siloxane units including, but not limited to, $HR^3_2SiO_{1/2}$, $R^3_3SiO_{1/2}$, $HR^3SiO_{2/2}$, $R^3_2SiO_{2/2}$, $R^3SiO_{3/2}$, and $SiO_{4/2}$ units—In the preceding formulae, each $R^3$ is independently selected from monovalent organic groups free of aliphatic unsaturation.

Component (B) may comprise a compound of the formulae

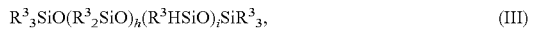

$$R^3_3SiO(R^3_2SiO)_h(R^3HSiO)_iSiR^3_3, \quad (III)$$

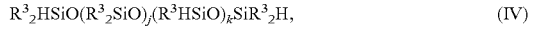

$$R^3_2HSiO(R^3_2SiO)_j(R^3HSiO)_kSiR^3_2H, \quad (IV)$$

or a combination thereof.

In formulae (III) and (IV) above, subscript h has an average value ranging from 0 to 2000, subscript i has an average value ranging from 2 to 2000, subscript j has an average value ranging from 0 to 2000, and subscript k has an average value ranging from 0 to 2000. Each $R^3$ is independently a monovalent organic group. Suitable monovalent organic groups include alkyl such as methyl, ethyl, propyl, pentyl, octyl, decyl, undecyl, dodecyl, and octadecyl; cycloalkyl such as cyclopentyl and cyclohexyl; alkenyl such as vinyl, allyl, butenyl, and hexenyl; alkynyl such as ethynyl, propynyl, and butynyl; and aryl such as phenyl, tolyl, xylyl, benzyl, and 2-phenylethyl.

Exemplary molecules useful as component (B) are:
a methylhydrogenpolysiloxane capped at both molecular terminals with trimethylsiloxy groups;
a copolymer of a methylhydrogensiloxane and a dimethylsiloxane capped at both molecular terminals with trimethylsiloxy groups;
a dimethylpolysiloxane capped at both molecular terminals with dimethylhydrogensiloxy groups;
a methylhydrogenpolysiloxane capped at both molecular terminals with dimethylhydrogensiloxy groups;
a copolymer of a methylhydrogensiloxane and a dimethylsiloxane capped at both molecular terminals with dimethylhydrogensiloxy groups;
a cyclic methylhydrogenpolysiloxane;
an organosiloxane composed of siloxane units represented by the following formulae: $(CH_3)_3 SiO_{1/2}$, $(CH_3)_2 HSiO_{1/2}$, and $SiO_{4/2}$; tetra(dimethylhydrogensiloxy) silane, or methyl-tri(dimethylhydrogensiloxy) silane.

Component (B) may be a combination of two or more organohydrogenpolysiloxanes that differ in at least one of the following properties: structure, average molecular weight, viscosity, siloxane units, and sequence. Component (B) may include a silane. Dimethylhydrogensiloxy-terminated polydimethylsiloxanes having relatively low degrees of polymerization (e.g., DP ranging from 3 to 50) are commonly referred to as chain extenders, and a portion of component (B) may be a chain extender.

Methods of preparing linear, branched, and cyclic organohydrogenpolysiloxanes suitable for use as component (B), such as hydrolysis and condensation of organohalosilanes, are well known in the art. Methods of preparing organohydrogenpolysiloxane resins suitable for use as component (B) are also well known as exemplified in U.S. Pat. Nos. 5,310,843; 4,370,358; and 4,707,531.

Component (C)—Hydrosilylation Catalyst

Component (C) is a catalyst that accelerates the hydrosilylation reaction. Suitable hydrosilylation catalysts are known in the art and commercially available. Component (C) may comprise a platinum group metal selected from platinum, rhodium, ruthenium, palladium, osmium or iridium metal or organometallic compound thereof, or a combination thereof.

Component (C) is used in an amount such that in terms of weight units the content of platinum group metal is in the range of 0.01 to 1,000 ppm, alternatively 0.1 to 500 ppm alternatively 1 to 500 ppm, alternatively 2 to 200, alternatively 5 to 150 ppm, per the total weight of components (A) and (B).

Component (C) is exemplified by a fine platinum metal powder, platinum black, platinum dichloride, platinum tetrachloride; chloroplatinic acid, alcohol-modified chloroplatinic acid, chloroplatinic acid hexahydrate; and complexes of said compounds, such as platinum complex of olefin, platinum complex of carbonyl, platinum complex of alkenylsiloxane, e.g. 1,3-divinyltetramethyldisiloxane, platinum complex of low molecular weight organopolysiloxanes, for example 1,3-diethenyl-1,1,3,3-tetramethyldisiloxane, a complex of chloroplatinic acid with β-diketone, a complex a chloroplatinic acid with olefin, and a complex of a chloroplatinic acid with 1,3-divinyltetramethyldisiloxane.

Component (C) may also be a rhodium compound, such as those expressed by formulae: $RhX_3[(R^4)_2S]_3$; $(R^5_3P)_2Rh(CO)X$, $(R^5_3P)_2Rh(CO)H$, $Rh_2X_2Y_4$, $H_fRh_g(En)_hCl_i$, or $Rh[O(CO)R]_{3-j}(OH)_j$ (where X designates a hydrogen atom, chlorine atom, bromine atom, or iodine atom; Y designates a methyl group, ethyl group, or a similar alkyl group, CO, $C_8H_{14}$, or 0.5 $C_8H_{12}$; $R^4$ designates a methyl, ethyl, propyl, or a similar alkyl group; a cycloheptyl, cyclohexyl, or a similar cycloalkyl group; or a phenyl, xylyl or a similar aryl group; $R^5$ designates methyl group, ethyl group, or a similar alkyl group; phenyl, tolyl, xylyl, or a similar aryl group; methoxy, ethoxy, or a similar alkoxy group; "En" designates ethylene, propylene, butene, hexene, or a similar olefin; "f" is 0 or 1; "g" is 1 or 2; "h" is an integer from 1 to 4; "i" is 2, 3, or 4; and "j" is 0 or 1). More particularly, the rhodium compounds are $RhCl(Ph_3P)_3$, $RhCl_3[S(C_4H_9)_2]_3$, $[Rh(O_2CCH_3)_2]_2$, $Rh(OCCH_3)_3$, $Rh_2(C_8H_{15}O_2)_4$, $Rh(C_5H_7O_2)_3$, $Rh(C_5H_7O_2)(CO)_2$, and $Rh(CO)[Ph_3P](C_5H_7O_2)$.

Component (C) may also be iridium group catalysts represented by the following formulae: $Ir(OOCCH_3)_3$, $Ir(C_5H_7O_2)_3$, $[Ir(Z)(En)_2]_2$, or $[Ir(Z)(Dien)]_2$ (where "Z" designates a chlorine atom, bromine atom, iodine atom, or a methoxy group, ethoxy group, or a similar alkoxy group; "En" designates ethylene, propylene, butene, hexene, or a similar olefin; and "Dien" designates cyclooctadiene)tetrakis(triphenyl). Component (C) may also be palladium, a mixture of palladium black and triphenylphosphine.

These complexes may be microencapsulated in a resin matrix or coreshell type structure, or may be mixed and embedded in thermoplastic organic resin powder composed of methylmethacrylate resin, carbonate resin, polystyrene resin, silicone resin, or similar resins.

Component (D)—Thermally Conductive Filler

Component (D) is a thermally conductive filler. Component (D) may be both thermally conductive and electrically conductive. Alternatively, component (D) may be thermally conductive and electrically insulating. Thermally conductive fillers are known in the art, see for example, U.S. Pat. No. 6,169,142 (col. 4, lines 7-33). Component (D) may comprise a metallic filler, an inorganic filler, a meltable filler, or a combination thereof.

The amount of component (D) in the composition depends on various factors including the silicone cure mechanism selected for the composition and the thermally conductive filler selected for component (D). However, the amount of component (D) may range from 30% to 97%, alternatively 50% to 95% by volume of the composition.

Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminum, copper, gold, nickel, tin, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces.

Inorganic fillers are exemplified by onyx; aluminum trihydrate, metal oxides such as aluminum oxide, beryllium oxide, magnesium oxide, and zinc oxide; nitrides such as aluminum nitride and boron nitride; carbides such as silicon carbide and tungsten carbide; and combinations thereof barium titanate, carbon fibers, diamond, graphite, magnesium hydroxide, and a combination thereof.

Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

The shape of the thermally conductive filler particles is not specifically restricted, however, rounded or spherical particles may prevent viscosity increase to an undesirable level upon high loading of the thermally conductive filler in the composition. The average particle size of the thermally conductive filler will depend on various factors including the type of thermally conductive filler selected for component (D) and the exact amount added to the curable composition, as well as the bondline thickness of the device in which the cured product of the composition will be used. In some particular instances, the thermally conductive filler may have an average particle size ranging from 0.1 micrometer to 80 micrometers, alternatively 0.1 micrometer to 50 micrometers, and alternatively 0.1 micrometer to 10 micrometers.

Component (D) may be a single thermally conductive filler or a combination of two or more thermally conductive fillers that differ in at least one property such as particle shape, average particle size, particle size distribution, and type of filler. In some embodiments, combinations of metallic and inorganic fillers, such as a combination of aluminum and aluminum oxide fillers; a combination of aluminum and zinc oxide fillers; or a combination of aluminum, aluminum oxide, and zinc oxide fillers may be used. In other embodiments, it may be desirable to combine a first conductive filler having a larger average particle size with a second conductive filler having a smaller average particle size in a proportion meeting the closest packing theory distribution curve. An example would be mixing two aluminum oxide preparations having different average particle sizes. In other embodiments, different thermally conductive filler materials with difference sizes may be used, for example, a combination of an aluminum oxide having a larger average particle size with a zinc oxide having a smaller average particle size. Alternatively, it may be desirable to use combinations of metallic fillers, such as a first aluminum having a larger average particle size and a second aluminum having a smaller average particle size. Use of a first filler having a larger average particle size and a second filler having a smaller average particle size than the first filler may improve packing efficiency, may reduce viscosity, and may enhance heat transfer.

Thermally conductive fillers are commercially available. For example, meltable fillers may be obtained from Indium Corporation of America, Utica, N.Y., U.S.A.; Arconium, Providence, R.I., U.S.A.; and AIM Solder, Cranston, R.I., U.S.A. Aluminum fillers are commercially available, for example, from Toyal America, Inc. of Naperville, Ill., U.S.A. and Valimet Inc., of Stockton, Calif., U.S.A. Silver filler is commercially available from Metalor Technologies U.S.A. Corp. of Attleboro, Mass., U.S.A. Zinc oxides, such as zinc oxides having trademarks KADOX® and XX®, are commercially available from Zinc Corporation of America of Monaca, Pennsylvania, U.S.A. Further, CB-A20S and Al-43-Me are aluminum oxide fillers of differing particle sizes commercially available from Showa-Denko, and AA-04, AA-2, and AA 18 are aluminum oxide fillers commercially available from Sumitomo Chemical Company. Boron nitride filler is commercially available from Momentive Corporation, Cleveland, Ohio, U.S.A.

Component (E)—Stabilizing Additive

Component (E) is a pigment that has an effect of preserving the desired physical characteristic of the thermally conductive silicone materials, namely the appropriate softness and compliant nature. Component (E) comprises a phthalocyanine compound. Component (E) is added to the thermally conductive polyorganosiloxane composition in an amount such that in terms of weight units the phthalocyanine compound is within the range of 0.01 to 5.0% of the composition as a whole. Alternatively, the phthalocyanine compound comprises 0.05 to 0.2% of the composition. Alternatively, phthalocyanine compound comprises 0.07 to 0.1% of the composition.

Suitable phthalocyanine compounds are represented by formula (V).

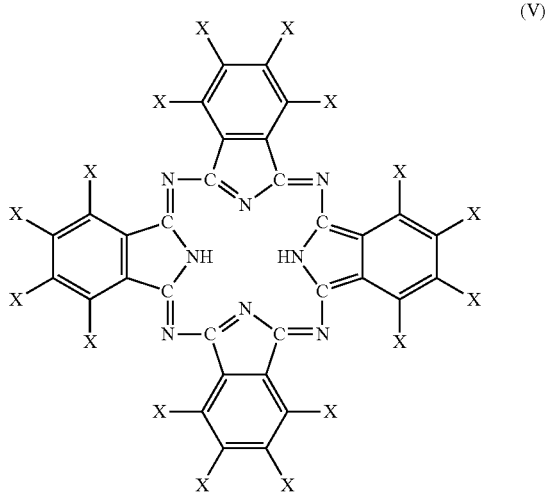

(V)

X each independently represents a hydrogen or halogen atom. Suitable halogen atoms are chlorine, bromine, and iodine. Preferably, the phthalocyanine compound is 29H, 31H-phthalocyanine.

The metal phthalocyanine compounds can be represented by the following formula (VI)

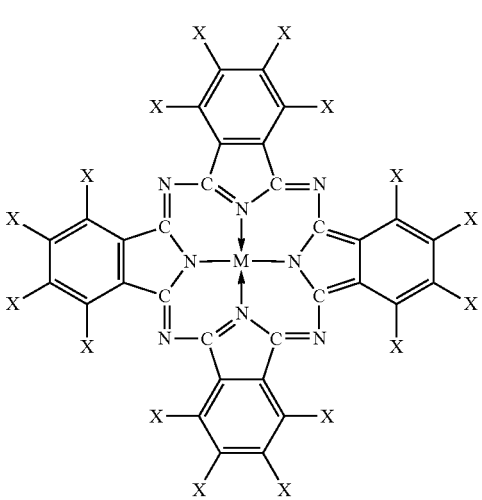

(VI)

In formula (VI) X has the same definition as in formula (V) and M is a metal atom selected from copper, nickel, cobalt, iron, chromium, zinc, platinum, and vanadium. [When M is copper, all X are hydrogens.] A preferred phthalocyanine compound is 29H, 31H-phthalocyaninato (2-)-N29, N30, N31, N32 copper. Phthalocyanine compounds are available commercially, such as Stan-tone™ 40SP03 from PolyOne Corporation, Avon Lake, Ohio, USA.

Other Components

The organopolysiloxane composition may comprise other optional components. The additional Component may be selected from the group consisting of (F) a spacer, (G) a reinforcing or extending filler, (H) filler treating agent, (I) an adhesion promoter, (J) a vehicle, (K) a surfactant, (L) a flux agent, (M) an acid acceptor, (N) a hydrosilylation inhibitor, (O) an additional stabilizer (e.g., a hydro silylation cure stabilizer, a heat stabilizer, or a UV stabilizer), and a combination thereof.

(F) Spacer

Component (F) is a spacer. Spacers can comprise organic particles, inorganic particles, or a combination thereof. Spacers can be thermally conductive, electrically conductive, or both. Spacers can have a particle size of at least 25 micrometers up to 125 micrometers. Spacers can comprise monodisperse beads, such as glass or polymer (e.g., polystyrene) beads. Spacers can comprise thermally conductive fillers such as alumina, aluminum nitride, atomized metal powders, boron nitride, copper, and silver. The amount of Component (F) depends on various factors including the particle size distribution, pressure to be applied during placement of the curable composition or cured product prepared therefrom, and temperature during placement. However, the composition may contain an amount of Component (F) ranging from 0.05% to 2%, alternatively 0.1% to 1%. Component (F) may be added to control bondline thickness of the cured product of the curable composition.

(G) Reinforcing Filler

Component (G) is a reinforcing and/or extending filler. The amount of component (G) in the composition depends on various factors including the materials selected for components (A), (B), (C), (D) and (E) and the end use of the composition. However, the amount of component (G) may range from 0.1 wt % to 10 wt % based on the weight of the composition. Suitable reinforcing and extending fillers are known in the art and are exemplified by precipitated and ground silica, precipitated and ground calcium carbonate, quartz, talc, chopped fiber such as chopped KEVLAR®, or a combination thereof.

(H) Filler Treating Agent

The thermally conductive filler for component (D) and the reinforcing and/or extending filler for component (G) and/or the spacer for component (F), if present, may optionally be surface treated with component (H) a treating agent. Treating agents and treating methods are known in the art, see for example, U.S. Pat. No. 6,169,142 (col. 4, line 42 to col. 5, line 2).

The amount of component (H) may vary depending on various factors including the type and amounts of fillers selected for components (D) and (G) and whether the filler is treated with component (H) in situ or before being combined with other components of the composition. However, the composition may comprise an amount ranging from 0.1% to 2% of component (H).

The component (H) may comprise an alkoxysilane having the formula: $R^6_mSi(OR^7)_{(4-m)}$, where subscript m is 1, 2, or 3; alternatively m is 3. Each $R^6$ is independently a monovalent organic group, such as a hydrocarbon group of 1 to 50 carbon atoms, alternatively 6 to 18 carbon atoms. $R^6$ is exemplified by alkyl groups such as hexyl, octyl, dodecyl, tetradecyl, hexadecyl, and octadecyl; and aromatic groups such as benzyl, phenyl and phenylethyl. $R^6$ can be saturated or unsaturated, branched or unbranched, and unsubstituted. $R^6$ can be saturated, unbranched, and unsubstituted.

Each $R^7$ may be an unsubstituted, saturated hydrocarbon group of 1 to 4 carbon atoms, alternatively 1 to 2 carbon atoms. Alkoxysilanes for component (H) are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alkoxy-functional oligosiloxanes can also be used as treatment agents. Alkoxy-functional oligosiloxanes and methods for their preparation are known in the art, see for example, EP 1 101 167 A2. For example, suitable alkoxy-functional oligosiloxanes include those of the formula $(R^8O)_nSi(OSiR^9{}_2R^{10})_{(4-n)}$. In this formula, subscript n is 1, 2, or 3, alternatively n is 3. Each $R^8$ can be an alkyl group. Each $R^9$ can be independently selected from saturated and unsaturated monovalent hydrocarbon groups of 1 to 10 carbon atoms. Each $R^{10}$ can be a saturated or unsaturated monovalent hydrocarbon group having at least 11 carbon atoms.

Metal fillers can be treated with alkylthiols such as octadecyl mercaptan and others, and fatty acids such as oleic acid, stearic acid, titanates, titanate coupling agents, zirconate coupling agents, and a combination thereof.

Treatment agents for alumina or passivated aluminum nitride may include alkoxysilyl functional alkylmethyl polysiloxanes (e.g., partial hydrolysis condensate of $R^{11}{}_oR^{12}{}_pSi(OR^{13})_{(4-o-p)}$, or cohydrolysis condensates or mixtures), or similar materials where the hydrolyzable group may comprise silazane, acyloxy or oximo. In all of these, a group tethered to Si, such as $R^{11}$ in the formula above, is a long chain unsaturated monovalent hydrocarbon or monovalent aromatic-functional hydrocarbon. Each $R^{12}$ is independently a monovalent hydrocarbon group, and each $R^{13}$ is independently a monovalent hydrocarbon group of 1 to 4 carbon atoms. In the formula above, subscript o is 1, 2, or 3 and subscript p is 0, 1, or 2, with the proviso that the sum o+p is 1, 2, or 3. One skilled in the art could optimize a specific treatment to aid dispersion of the filler without undue experimentation.

(I) Adhesion Promoter

Component (I) is an adhesion promoter. Suitable adhesion promoters may comprise alkoxysilanes of the formula $R^{14}{}_qSi(OR^{15})_{(4-q)}$, where subscript q is 1, 2, or 3, alternatively q is 3. Each $R^{14}$ is independently a monovalent organofunctional group. $R^{14}$ can be an epoxyfunctional group such as glycidoxypropyl or (epoxycyclohexyl)ethyl, an amino functional group such as aminoethylaminopropyl or aminopropyl, a methacryloxypropyl, or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Examples of suitable adhesion promoters include glycidoxypropyltrimethoxysilane and a combination of glycidoxypropyltrimethoxysilane with an aluminum chelate or zirconium chelate. Examples of adhesion promoters for hydro silylation curable compositions may be found in U.S. Pat. Nos. 4,087,585 and 5,194,649. The curable composition may comprise 0.5% to 5% of adhesion promoter based on the weight of the composition.

(J) Vehicle

Component (J) is a vehicle such as a solvent or diluent. Component (J) can be added during preparation of the composition, for example, to aid mixing and delivery. All or a portion of component (J) may optionally be removed after the composition is prepared.

(K) Surfactant

Component (K) is a surfactant. Suitable surfactants include silicone polyethers, ethylene oxide polymers, propylene oxide polymers, copolymers of ethylene oxide and propylene oxide, other non-ionic surfactants, and combinations thereof. The composition may comprise up to 0.05% of the surfactant based on the weight of the composition.

(L) Flux Agent

Component (L) is a flux agent. The composition may comprise up to 2% of the flux agent based on the weight of the composition. Molecules containing chemically active functional groups such as carboxylic acid and amines can be used as flux agents. Such flux agents can include aliphatic acids such as succinic acid, abietic acid, oleic acid, and adipic acid; aromatic acids such as benzoic acids; aliphatic amines and their derivatives, such as triethanolamine, hydrochloride salts of amines, and hydrobromide salts of amines. Flux agents are known in the art and are commercially available.

(M) Acid Acceptor

Component (M) is an acid acceptor. Suitable acid acceptors include magnesium oxide, calcium oxide, and combinations thereof. The composition may comprise up to 2% of component (M) based on the weight of the composition.

(N) Hydrosilylation Stabilizer

Component (N) is a hydrosilylation stabilizer to prevent premature curing of the curable composition. In order to adjust speed of curing and to improve handling of the composition under industrial conditions, the composition may be further combined with an alkyne alcohol, enyne compound, benzotriazole, amines such as tetramethyl ethylenediamine, dialkyl fumarates, dialkenyl fumarates, dialkoxyalkyl fumarates, maleates such as diallyl maleate, and a combination thereof. Alternatively, the stabilizer may comprise an acetylenic alcohol. The following are specific examples of such compounds: such as 2-methyl-3-butyn-2-ol, 3-methyl-1-butyn-3-ol, 3,5-dimethyl-1-hexyn-3-ol, 2-phenyl-3-butyn-2-ol, 3-phenyl-1-butyn-3-ol, 1-ethynyl-1-cyclohexanol, 1,1-dimethyl-2-propynyl)oxy)trimethylsilane, methyl(tris(1,1-dimethyl-2-propynyloxy))silane, or similar acetylene-type compounds; 3-methyl-3-penten-1-yne, 3,5-dimethyl-3-hexen-1-yne, or similar en-yne compounds; Other additives may comprise hydrazine-based compounds, phosphines-based compounds, mercaptane-based compounds, cycloalkenylsiloxanes such as methylvinylcyclosiloxanes such as 1,3,5,7-tetramethyl-1,3,5,7-tetravinyl cyclotetrasiloxane, 1,3,5,7-tetramethyl-1,3,5,7-tetrahexenyl cyclotetrasiloxane, benzotriazole, or similar triazols. The content of such inhibitors in the hydrosilation-curable thermoconductive silicone elastomer composition may be within the range of 0.0001 to 5 parts by weight per 100 parts by weight of component (A). Suitable hydro silylation cure inhibitors are disclosed by, for example, U.S. Pat. Nos. 3,445,420; 3,989,667; 4,584,361; and 5,036,117.

(O) Stabilizer

Component (O) is an additional stabilizer. Plasticizing agents and other known agents to stabilize the composition against heat, UV, and other physical conditions may be added to further enhance the stability of the curable and cured compositions.

One skilled in the art would recognize when selecting components for the composition described above, there may be overlap between types of components because certain components described herein may have more than one function. For example, certain alkoxysilanes may be useful as filler treating agents and as adhesion promoters, and certain plasticizers such as fatty acid esters may also be useful as filler treating agents. One skilled in the art would be able to distinguish among and select appropriate components, and amounts thereof, based on various factors including the intended use of the composition and whether the composition will be prepared as a one-part or multiple-part composition.

Method of Preparation of the Composition

The composition can be prepared by a method comprising combining all ingredients by any convenient means such as mixing at ambient or elevated temperature. Alternatively, the composition may be prepared by mixing some components into a first mixture (i.e. part (a)) and separately mixing other components into a second mixture (i.e. part (b)), and then mixing the two parts immediately before curing. Part (a) and part (b) may both contain some of the same components. When the composition is prepared at elevated temperature, the temperature during preparation is less than the curing temperature of the composition.

When ingredient (H) is present, the composition may optionally be prepared by surface treating ingredient (D) (and ingredient (G), if present) with ingredient (H) and thereafter mixing the product thereof with the other ingredients of the composition. Alternatively, the composition may be prepared as a multiple part composition, for example, when ingredient (N) is absent or when the composition will be stored for a long period of time before use. In the multiple part composition, the crosslinker and catalyst are stored in separate parts, and the parts are combined shortly before use of the composition. For example, a two part curable silicone composition may be prepared by combining ingredients comprising base polymer, catalyst, thermally conductive filler and plasticizer, and one or more additional ingredients in a base part by any convenient means such as mixing. A curing agent part may be prepared by combining ingredients comprising crosslinker, base polymer, thermally conductive filler and plasticizer, and one or more additional ingredients by any convenient means such as mixing. The ingredients may be combined at ambient or elevated temperature, depending on the cure mechanism selected. When a two part curable silicone composition is used, the weight ratio of amounts of base to curing agent may range from 1:1 to 10:1. One skilled in the art would be able to prepare a curable composition without undue experimentation.

The compositions described herein are formulated so that, when cured, they have certain desired characteristics as described in the following sections.

Methods of Use

The composition can be formulated to form a cured silicone having a thermal conductivity ranging from 0.2 to 7 W/mK. Thermal impedance depends on various factors including the thickness of the cured silicone and the amount and type of the filler selected for ingredient (D).

The composition described above may be cured to form a thermal interface material (TIM). A method of forming a TIM may comprise:
1) interposing the composition described above along a thermal path between a heat source and a heat dissipator, and
2) heating the composition to a temperature sufficient to cure the composition, thereby forming a thermal interface material.

In step 1), the composition can be applied either to the heat source (e.g., (opto)electronic component) and thereafter the heat dissipator, the composition can be applied to the heat dissipator and thereafter to the heat source, or the composition can be applied to the heat source and heat dissipator simultaneously.

Alternatively, the method may comprise:
1) curing the composition described above, and thereafter 2) interposing the product of step 1) along a thermal path between a heat source and a heat dissipator.

In step 2), the product of step 1) can be applied either to the heat source (e.g., (opto)electronic component) and thereafter the heat dissipator, the composition can be applied to the heat dissipator and thereafter to the heat source, or the composition can be applied to the heat source and heat dissipator simultaneously. This method optionally further comprises the step of applying the composition to a support before step 1). The product of this method is an interface material.

The interface material comprises: 1) a cured silicone prepared by curing the composition described above, where the cured silicone is formed as a flat member, a hemispherical nubbin, a convex member, a pyramid, or a cone.

The composition may optionally be applied to a surface of a support before step 1). The support is exemplified by a carbon fiber mesh, metal foil, a perforated metal foil (mesh), a filled or unfilled plastic film (such as a polyamide sheet, a polyimide sheet, polyethylene naphthalate sheet, a polyethylene terephthalate polyester sheet, a polysulfone sheet, a polyether imide sheet, or a polyphenylene sulfide sheet), or a woven or nonwoven substrate (such as fiberglass cloth, fiberglass mesh, or aramid paper). The composition may be coated on two sides of the support. The interface material may further comprise II) a release sheet covering a surface of the cured silicone opposite the support.

In the methods and devices described herein, the heat source may comprise an (opto)electronic component such as a light emitting diode (LED), a semiconductor, a transistor, an integrated circuit, or a discrete device. The heat dissipator may comprise a heat sink, a thermally conductive plate, a thermally conductive cover, a fan, a circulating coolant system, or a combination thereof.

EXAMPLES

Example 1

These examples are intended to illustrate the invention to one skilled in the art and should not be interpreted as limiting the scope of the invention set forth in the claims. The following raw materials were used to prepare samples in these examples. Part (a) of the two-part mixture was prepared as by mixing components (A), (C), (D), and (H). Part (b) of the two-part mixture was prepared by mixing components (A), (B), (D), (H), (N), and carbon black pigment to add color. Component (A) was a vinyl-terminated polydimethylsiloxane having a viscosity ranging from 300 to 1000 centiStokes (cSt). Component (B) was a trimethyl terminated poly(dimethyl-hydrogen siloxane) polymer and a dimethylpolysiloxane capped at both molecular terminals with dimethylhydrogensiloxy groups. Component (C) was a mixture of platinum catalyst in silicone fluid. Component (D) was alumina with average particle size of 2 μm. Component (H) was n-octyltrimethoxysilane. 3,5-Dimethyl-1-hexyn-3-ol, was added as component (N). When ready for use, equal amounts of part (a) and part (b) were combined. The SiH/Vi ratio of the composition after the two parts were combined was 0.7. The alumina particles accounted for 83 wt % of the composition. The catalytic platinum consisted 180 ppm of the composition and the hydrosilylation stabilizer consisted 0.005 wt % of the composition.

Example 2

Comparative Result

The composition of Example 1 was allowed to cure by letting the combined component stand for 60 minutes at 125° C., and the hardness of the cured material was measured and shown according to Durometer Shore Type OO scale (ASTM D 2240). The cured material was then kept in a constant temperature atmosphere for up to 50 days in an oven. The results are shown in FIG. 1, which shows the hardness change of the cured material as a function of aging temperature. The hardness was measured for batch 23178-36 kept at 50 (♦ blue), 70 (■ brown), 90 (▲ green), 120 (✖ purple), and 150 (✱ light blue) degrees Celsius atmosphere, on day 4, 9, 17, 23, 33, 46 and 100. The cured material was also kept at 85 degrees Celsius and controlled humidity of 85% (●, orange,85/85). As seen in FIG. 1, the hardness increased at elevated temperatures over time. Table 1 also shows the data in a numeric form.

| Temp. (° C.) | Days At Temperature | | | | | | |
|---|---|---|---|---|---|---|---|
| | 0 | 4 | 9 | 17 | 23 | 33 | 46 | 100 |
| 50° C. | 36 | 38 | 39 | 37 | 38 | 38 | | 37 |
| 70° C. | 36 | 43 | 45 | 44 | 47 | 50 | 51 | 59 |
| 90° C. | 36 | 57 | 62 | 64 | 65 | 64 | 67 | |
| 120° C. | 36 | 52 | 56 | 56 | 57 | 57 | 62 | 63 |
| 150° C. | 36 | 44 | 49 | 54 | 57 | 62 | | 75 |
| 85° C./85% RH | 36 | 33 | 29 | 30 | | 28 | | |

Example 3

Several batches of the two-part composition samples were prepared as described above, except that 0.08 wt % (relative to the final combined composition) of phthalocyanine copper (0.2% Harwick Stan-Tone™ 40SP03 (PolyOne, Ohio, USA) blue pigment) was added to some samples by mixing it in Part (b) prior to cure. The cured compositions were kept at 90 degrees Celsius and 120 degrees Celsius for up to 37 days. The hardness was measured by Durometer Shore OO scale on day 3, 7 or 8, 18 or 21, and 34. Table 2a-2b shows the results of batch 23534-11 with and without a phthalocyanine blue pigment.

TABLE 2a

Sample 23534-11

| Storage Temp | Storage Time at Temperature (Days) | | | |
|---|---|---|---|---|
| | 0 | 2 | 8 | 21 |
| 90° C. | 32 | 57 | 77 | 78 |
| 120° C. | 32 | 66 | 79 | 78 |

TABLE 2b

Sample 23534-11 with addition of 0.2% Stantone Blue

| Storage Temp | Storage Time at Temperature (Days) | | | | |
|---|---|---|---|---|---|
| | 0 | 3 | 7 | 18 | 34 |
| 90° C. | 28 | 29 | 30 | 29 | 28 |
| 120° C. | 28 | 33 | 32 | 30 | 29 |

Figure 2:
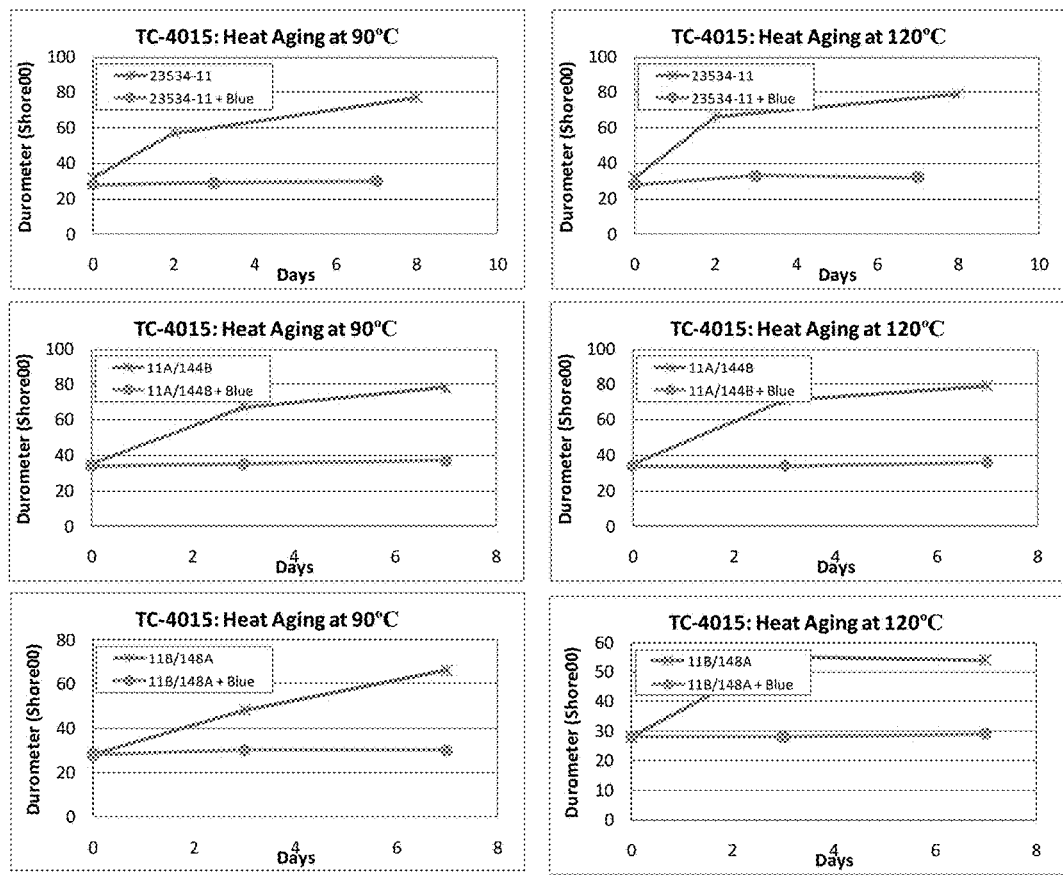
FIG. 2 shows the addition of a phthalocyanine compound prevents the increase in hardness.

FIG. 2 also shows the results of three different preparations, 23534-11, 11A/144B, and 148A/11B. As can be seen in the table and the figure, the composition containing phthalocyanine copper (+Blue, orange circle in FIG. 2) retained its pliant nature for the duration of the trial at either temperature, whereas the composition without phthalocyanine copper (light blue in FIG. 2) increased in hardness.

Example 4

Two-part composition was prepared as described in Example 1, except that the alumina filler was a mixture of one type with average particle size of 35 μm (56.52 wt %) and a second type with average particle size of 2 μm (33.45 wt %) and the SiH/Vi ratio was 0.7. The composition also included a long chain silicone treating agent as an additional component (0.15 wt %). As in Example 2, 0.08 wt % (relative to the final combined composition) of phthalocyanine copper (0.2% Harwick Stan-Tone™ 40SP03 (PolyOne, Ohio, USA) blue pigment) was added to some samples by mixing it in Part (b). The cured compositions were kept at 90 degrees Celsius and 120 degrees Celsius for up to 37 days. The hardness was measured by Durometer Shore OO scale on day 2, 8, 21, and 37. Table 3a-3b shows the result. The composition containing phthalocyanine copper retained its pliant nature for the duration of the trial, whereas the composition without phthalocyanine copper increased in hardness.

TABLE 3a

Sample 23178-58

| Storage Temp | Storage Time at Temperature (Days) | | | |
|---|---|---|---|---|
| | 0 | 2 | 8 | 21 |
| 90° C. | 48 | 67 | 77 | 85 |
| 120° C. | 48 | 72 | 82 | 83 |

TABLE 3b

Sample 23178-58 with addition of 0.2% Stantone Blue

| Storage Temp | Storage Time at Temperature (Days) | | | | |
|---|---|---|---|---|---|
| | 0 | 2 | 8 | 21 | 37 |
| 90° C. | 48 | 48 | 49 | 49 | 46 |
| 120° C. | 48 | 48 | 48 | 48 | 49 |

We claim:

1. A composition comprising
   (A) an organoalkylpolysiloxane having in one molecule on average at least 0.1 silicon-bonded alkenyl groups;
   (B) a polyorganosiloxane having in one molecule on average at least 2 silicon- bonded hydrogen atoms, the molar ratio of SiH groups in the component (B) to aliphatically unsaturated organic group in the component (A) is 3:1 to 0.1:1;
   (C) a hydrosilylation reaction catalyst in an amount sufficient to initiate curing of the composition (A) and (B);
   (D) a thermally conductive filler, wherein the thermally conductive filler is selected from aluminum nitride, aluminum oxide, aluminum trihydrate, barium titanate, beryllium oxide, boron nitride, carbon fibers, diamond, graphite, magnesium hydroxide, magnesium oxide, metal particulate, onyx, silicon carbide, tungsten carbide, zinc oxide, and a combination thereof, and wherein the thermally conductive filler is in an amount ranging from 50% to 97% by volume of the composition; and
   (E) an additive selected from the group consisting of metal-free and metal-containing phthalocyanine compounds, wherein the amount of the additive is from 0.01 to 5.0 weight % of the composition.

2. The composition according to claim 1 wherein the additive is a metal-containing phthalocyanine compound in 0.05 to 0.2 weight % of the composition.

3. The composition according to claim 2 wherein the metal is copper.

4. The composition according to claim 3 wherein the copper-containing phthalocyanine compound is 29H, 31H-phthalocyaninato (2-)-N29, N30, N31, N32 Copper.

5. The composition according to claim 1 wherein the thermally conductive filler is selected from aluminum nitride and boron nitride.

6. A cured silicone prepared by curing the composition of claim 1.

7. A thermal interface material comprising the cured silicone according to claim 6.

8. The thermal interface material according to claim 7 wherein the material comprises a support coated with the cured silicone.

9. A method of increasing the stability of a thermally conductive organopolysiloxane composition comprising the step of adding a phthalocyanine compound ranging from 0.01 to 5.0 weight % of the whole composition and thermally conductive filler ranging from 50% to 97% by volume of the whole composition to the curable organopolysiloxane composition, wherein molar ratio of SiH:Vi of the curable organopolysiloxane composition is from 3:1 to 0.1:1.

10. A method of conducting heat from a first component to a second component wherein the first component has a higher temperature than the second component and the thermal interface material according to claim 7 is in contact with the first component and with the second component.

11. A method of dissipating heat from a first component wherein the thermal interface material according to claim 8 is in contact with the first component.

12. The composition according to claim 1 wherein the thermally conductive filler is selected from aluminum oxide, beryllium oxide, magnesium oxide, boron nitride and zinc oxide.

13. The composition according to claim 1 wherein the thermally conductive filler is aluminum trihydrate.

14. The composition according to claim 1 wherein the thermally conductive filler is selected from barium titanate, carbon fibers, diamond, graphite, magnesium hydroxide, and a combination thereof.

15. The composition according to claim 1 wherein the thermally conductive filler is metal particulate and the metal particulate is selected from the group consisting of aluminum, copper, gold, nickel, tin, silver, and combinations thereof.

16. The composition according to claim 1 wherein the thermally conductive filler is onyx.

17. The composition according to claim 1 wherein the thermally conductive filler is selected from silicon carbide and tungsten carbide.

* * * * *